United States Patent
Onishi et al.

(10) Patent No.: US 7,452,119 B2
(45) Date of Patent: Nov. 18, 2008

(54) LIGHTING DEVICE, LIQUID CRYSTAL DISPLAY DEVICE, AND ELECTRONIC APPARATUS

(75) Inventors: Yasunori Onishi, Nagano (JP); Katsumi Yamada, Nagano (JP); Yasutaka Masunaga, Nagano (JP)

(73) Assignee: Seiko Epson Corporation (JP)

( * ) Notice: Subject to any disclaimer, the term of this patent is extended or adjusted under 35 U.S.C. 154(b) by 53 days.

(21) Appl. No.: 11/113,415

(22) Filed: Apr. 22, 2005

(65) Prior Publication Data

US 2005/0259440 A1 Nov. 24, 2005

(30) Foreign Application Priority Data

May 18, 2004 (JP) .............................. 2004-147536

(51) Int. Cl.
*F21V 7/04* (2006.01)
(52) U.S. Cl. ...................... 362/620; 362/626; 362/511; 362/330; 362/555; 362/560; 362/561; 362/235
(58) Field of Classification Search .................. 362/27, 362/561, 613, 620, 626, 511, 330, 555, 560, 362/235
See application file for complete search history.

(56) References Cited

U.S. PATENT DOCUMENTS

| | | | | |
|---|---|---|---|---|
| 5,704,703 | A * | 1/1998 | Yamada et al. | ................. 362/27 |
| 6,181,391 | B1 | 1/2001 | Okita | |
| 6,241,358 | B1 * | 6/2001 | Higuchi et al. | .............. 362/613 |
| 6,582,095 | B1 * | 6/2003 | Toyoda | ....................... 362/235 |
| 6,854,857 | B2 | 2/2005 | Hara et al. | |
| 2003/0227768 | A1 * | 12/2003 | Hara et al. | ..................... 362/31 |
| 2004/0012945 | A1 * | 1/2004 | Yamashita et al. | ............ 362/31 |
| 2004/0120139 | A1 * | 6/2004 | Kunimochi et al. | ........... 362/31 |

FOREIGN PATENT DOCUMENTS

| | | |
|---|---|---|
| CN | 1222028 | 7/1999 |
| JP | 2000-098383 | 4/2000 |
| JP | 2001-35222 | 2/2001 |
| JP | 2001-133776 | 5/2001 |
| JP | 2001-184923 | 7/2001 |
| JP | 2001-215338 | 8/2001 |
| JP | 2001-215496 | 8/2001 |
| JP | 2004-013097 | 1/2004 |
| JP | 2005-174706 | 6/2005 |

OTHER PUBLICATIONS

Communication from Japanese Patent Office regarding related application. Mar. 2007.

* cited by examiner

*Primary Examiner*—Stephen F Husar
*Assistant Examiner*—Jessica L McMillan
(74) *Attorney, Agent, or Firm*—Harness, Dickey & Pierce, P.L.C.

(57) ABSTRACT

A lighting device of the invention includes: a plurality of light sources; and an optical waveguide, wherein light emitted from the plurality of light sources is incident from a side of the optical waveguide and then emitted from one main plane of the optical waveguide. The optical waveguide includes a first inclined plane for reflecting light emitted from a first light source and then emitting the light from the one main plane, and a second inclined plane for reflecting light emitted from a second light source and then emitting the light from the one main plane at an exit angle different from the light emitted from the first light source, and wherein each of the light sources is independently driven.

9 Claims, 9 Drawing Sheets

LIGHTING DEVICE, LIQUID CRYSTAL DISPLAY DEVICE, AND ELECTRONIC APPARATUS

BACKGROUND OF THE INVENTION

1. Technical Field

The present invention relates to a lighting device, a liquid crystal display device, and an electronic apparatus.

2. Related Art

In recent years, liquid crystal display devices, such as liquid crystal panels, are widely installed in the image display units of various electronic apparatuses. For example, such liquid crystal display devices are suitably used in the display units of mobile devices such as mobile phones due to their slimness, low weight and low power consumption. The liquid crystal display devices mainly include a liquid crystal panel in which a liquid crystal layer is interposed between a pair of substrates, and a lighting device (backlight) disposed on the non-viewing screen side of the liquid crystal panel. Further, the orientation state of liquid crystal molecules is controlled by applying an electric field to the liquid crystal layer by transparent electrodes formed at the sides of the liquid crystal layer interposed between the pair of substrates, so that the incident light from the lighting device is modulated, thereby displaying an image.

The above-mentioned lighting device is mainly composed of a rectangular optical waveguide made of a light-transmissive material and a light source, such as a light-emitting diode (LED), which is disposed adjacent to the optical waveguide. The optical waveguide is formed with patterns of grooves or protrusions. Further, the light emitted from the light source and which is also incident from the side of the optical waveguide is reflected from the grooves or protrusions to be emitted from the main plane of the optical waveguide toward the liquid crystal panel. Japanese Unexamined Patent Application Publication Nos. 2001-133776 and 2001-184923 are examples of the related art.

However, because the above-mentioned mobile devices are widely used in public places, many mobile device users are frequently concerned about revealing their personal information, etc. to others while using it. On the other hand, because the liquid crystal display devices generally have a narrow viewing angle, it is difficult to read the display from a direction deviating from the viewing angle. Therefore, liquid crystal display devices have a usability problem.

SUMMARY

An advantage of the present invention is that it provides a lighting device in which the exit angle of emitted light can be changed.

Another advantage of the invention is that it provides an electro-optical device and an electronic apparatus in which the range of a viewing angle can be varied.

A lighting device of the invention includes: a plurality of light sources; and an optical waveguide, wherein light emitted from the plurality of light sources is incident from a side of the optical waveguide and then emitted from one main plane of the optical waveguide, wherein the optical waveguide includes a first inclined plane for reflecting light emitted from a first light source and then emitting the light from the one main plane, and a second inclined plane for reflecting light emitted from a second light source and then emitting the light from the one main plane at an exit angle different from the light emitted from the first light source, and wherein each of the light sources is independently driven.

According to this configuration, since each of the light sources is independently driven, the exit angle of the emitted light can be changed.

Further, it is preferable that the plurality of light sources are respectively disposed at different corners of the optical waveguide.

According to this configuration, since light can be incident on the entire optical waveguide, a dead angle region can be prevent when light is incident on the optical waveguide. It is thus possible to provide a compact lighting device in which light irregularities do not occur.

Furthermore, it is preferable that the lighting device further includes a light reflective sheet disposed on the other main plane of the optical waveguide.

According to this configuration, light leaked from the other main plane of the optical waveguide is reflected and then incident on the optical waveguide again. It is thus possible to increase the brightness of light emitted from the one main plane of the optical waveguide.

Further, it is preferable that the lighting device further includes a prism sheet disposed on the one main plane of the optical waveguide, wherein the prism sheet has indentations and protrusions at a side opposite to the one main plane of the optical waveguide, and refracts light emitted from the optical waveguide.

In addition, it is preferable that, in the prism sheet, the vertex angle of a prism, which is opposite to the one main plane of the optical waveguide, is set to 55° to 70°.

According to this configuration, not only the surface brightness of the emitted light can be made uniform, but also the reflection on the inclined plane can be prevented.

Furthermore, it is preferable that the gradient angle of the first inclined plane is set to 0.5° to 5°, and the gradient angle of the second inclined plane is set to 20° to 50°.

The prism sheet has a property of converting light having a wide exit angle, which is emitted from the optical waveguide, into light having a small exit angle, which is emitted from the prism sheet, and converting light of having a small exit angle, which is emitted from the optical waveguide, into light having a wide exit angle, which is emitted from the prism sheet. Therefore, not only the light from the first light source can be emitted at a small exit angle, but also the light from the second light source can be emitted at a wide exit angle. Accordingly, since each of the light sources is independently driven, the size of an exit angle can be changed.

Further, it is preferable that the lighting device further includes a diffuser sheet disposed on the one main plane of the optical waveguide, wherein the diffuser sheet diffuses the light emitted from the optical waveguide, and wherein the gradient angle of the first inclined plane is set to 35° to 50°, and the gradient angle of the second inclined plane is set to 5° to 35° or 50° to 70°.

According to this configuration, it is possible that the light from the first light source is emitted at a small exit angle, while the light from the second light source is emitted at a wide exit angle. Accordingly, since each of the light sources is independently driven, the size of an exit angle can be changed.

Furthermore, it is preferable that the inclined planes are provided in grooves and/or protrusions formed in the main plane of the optical waveguide, respectively.

According to this configuration, it is easy to control the exit angle of light unlike an embossing process or a blast process. Further, since inclined planes can be consecutively formed, the degree of freedom that changes the density of the inclined planes can be increased. Accordingly, light from the light source can be efficiently reflected and emitted from the optical waveguide.

Further, it is preferable that the inclined planes are disposed approximately in a concentric shape around each of the light sources.

According to this configuration, the light from the light source is vertically incident with respect to the extending direction of the inclined plane. Thus, the effective gradient angle of the inclined plane can be easily set so that the light is emitted from the optical waveguide at a predetermined exit angle.

Meanwhile, a liquid crystal display device of the invention includes the above-mentioned lighting device.

According to this configuration, by driving only the first light source, image display having a narrow viewing angle can be realized. Further, by driving only the second light source, image display having a wide viewing angle can be realized. It is thus possible to provide a liquid crystal display device having a variable viewing angle.

Meanwhile, an electronic apparatus of the invention includes the above-mentioned liquid crystal display device.

According to this configuration, it is possible to provide an electronic apparatus having a variable viewing angle.

BRIEF DESCRIPTION OF THE DRAWINGS

The invention will be described with reference to the accompanying drawings, wherein like numbers reference like elements, and wherein.

DESCRIPTION OF THE EMBODIMENTS

Hereinafter, embodiments according to the present invention will be described in detail with reference to the accompanying drawings. In the drawings, which will be referred to in the following description, each component has different dimensions and a reduced scale from its actual dimensions and scale so it can be easily viewed in the figures. Further, hereinafter, one main plane of an optical waveguide at the side of a liquid crystal panel will be defined as 'front surface', and the other main plane of the optical waveguide at an opposite side thereof will be defined as 'rear surface'.

Lighting Device

First Embodiment

FIGS. 1A and 1B are explanatory diagrams illustrating a lighting device according to a first embodiment of the invention. The lighting device 10 according to the embodiment mainly includes an optical waveguide 1 having a rectangular flat plate shape, a first light source 2 and a second light source 3 both of which are disposed in opposite to corners of the optical waveguide 1, a reflective sheet 5 disposed on a rear surface of the optical waveguide 1, and a diffuser sheet 4 disposed on a front surface of the optical waveguide 1.

FIG. 1A is a plan view of the lighting device according to a first embodiment of the invention, which is a cross-sectional view of the lighting device taken along line C-C of FIG. 1B. The lighting device 10 of the embodiment includes the optical waveguide 1 of a rectangular flat panel shape. The optical waveguide 1 is formed about 0.6 mm in thickness using a light-transmissive material such as an acrylic resin. Further, longitudinal corners 1A and 1B at both ends of one side of the optical waveguide 1 are truncated so that they are approximately orthogonal to straight lines that connect other corners diagonal to the corners 1A and 1B, respectively.

The first and second light sources 2 and 3 are disposed opposite to the truncated sides. At this time, the first and second light sources 2 and 3 are used as the light sources of the lighting device according to the embodiment. Although it is not specially limited, a solid light source, such as a light emitting diode (LED) having a small size and low power consumption, is suitable for the light sources of the lighting device according to the embodiment. Further, in the embodiment, it has been described that the two light sources are disposed in front of the corners 1A and 1B, respectively, at the both ends of the one side of the optical waveguide 1. Instead of that, the light sources may be disposed at corners of both ends of diagonal lines of the optical waveguide 1. It is also to be noted that the number of light sources is not limited to two, but additional light sources can be disposed at other corners other than the above-described corners.

However, a point light source, such as an LED, emits light in a radial direction within a range of about ±70° from its optical axis (a straight line that connects the centers of a light source, a lens, etc. in an optical system). For this reason, if the light source is disposed on the side surface of the optical waveguide 1, light is not incident on the optical waveguide 1 within a range exceeding about ±70° from the optical axis. Thus, there occurs a dead angle region of light incidence in the optical waveguide 1. This causes light irregularities to occur in the lighting device 10. On the other hand, in the lighting device according to the embodiment, since the light sources are disposed at the corners of the optical waveguide 1, the light can be incident on the entire optical waveguide 1. Thus, the dead angle region of light incidence does not occur in the optical waveguide 1. Therefore, a compact lighting device without light irregularities can be provided, and an electro-optical device and an electronic apparatus having excellent display quality can be thus provided.

FIG. 1B is a lateral cross-sectional view of the lighting device taken along line A-A of FIG. 1A. As shown in FIG. 1B, the reflective sheet 5 is disposed on a rear surface 1D of the optical waveguide 1. The reflective sheet 5 is disposed in such a way that a front surface of the reflective sheet 5 opposite to the optical waveguide 1 is a specular reflection face. Thus, the reflective sheet 5 can reflect light leaked from the rear surface of the optical waveguide 1 and then allow it to be incident on the optical waveguide 1 again. It is thus possible to increase the brightness of the light output from the front surface of the optical waveguide 1. Meanwhile, the diffuser sheet 4 is disposed on a front surface 1C of the optical waveguide 1. The diffuser sheet 4 can be formed of an acrylic sheet, etc. in which a diffusing agent is distributed. The diffuser sheet 4 can make the surface brightness of the light output from the lighting device uniform, and can also prevent the light from reflecting from the grooves or protrusions (to be described later).

Furthermore, a liquid crystal panel 100 is disposed on a light exit surface of the diffuser sheet 4 in the lighting device 10, with light-shielding tapes 8 for preventing the leakage of light, and the like being disposed therebetween. The liquid crystal panel 100 constitutes a liquid crystal display device to be described in detail later.

Inclined planes for reflecting light from the light sources toward the liquid crystal panel 100 are disposed in the optical waveguide 1.

Figure 1:
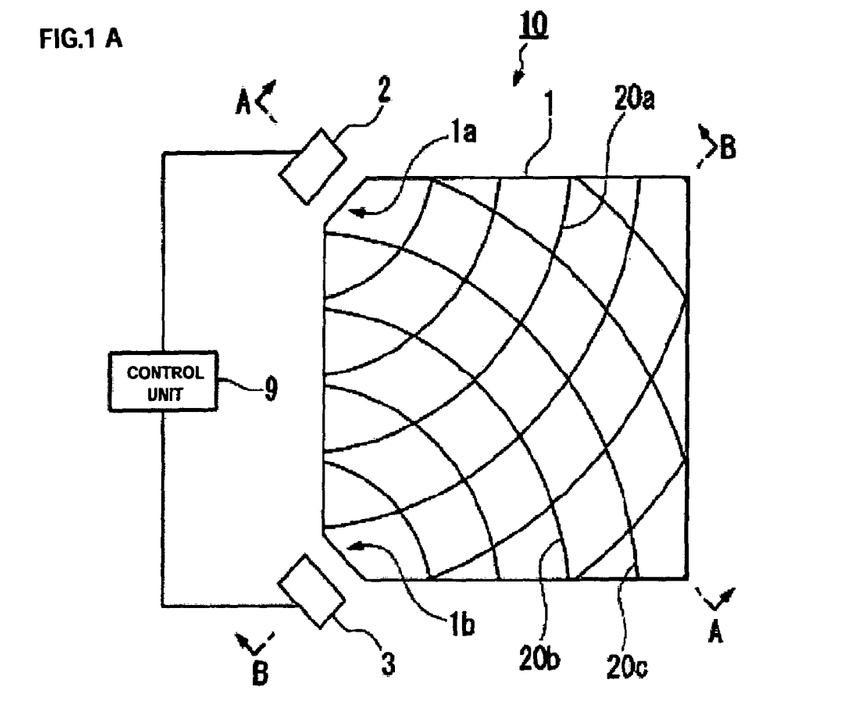
FIGS. 1A and 1B are explanatory diagrams illustrating a lighting device according to a first embodiment of the invention.
Figure 2:
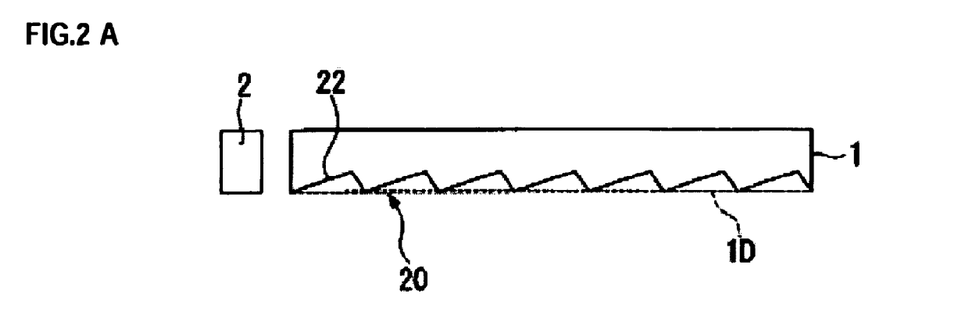
FIGS. 2A to 2D are explanatory diagrams illustrating various reflection units.

FIG. 2 is an explanatory diagram illustrating the shape of an inclined plane according to an aspect of the invention, which shows a lateral cross-sectional view of a portion corresponding to line A-A in FIG. 1A. Further, although an inclined plane corresponding to the first light source 2 will be described below as an example, the same is true of an inclined plane corresponding to the second light source 3. In FIG. 2A, grooves 20 are formed in the rear surface 1D of the optical waveguide 1. In this case, an inclined plane at the side of the light source 2 in the grooves 20 becomes an effective inclined plane 22 for reflecting light from the light source 2 toward the liquid crystal panel. Furthermore, as shown in FIG. 2B, protrusions 25 can be formed on the rear surface 1D of the optical waveguide 1. In this case, an inclined plane at the side opposite to the light source 2 in the grooves 20 becomes an effective inclined plane 22 for reflecting light from the light source 2 toward the liquid crystal panel. Meanwhile, as shown in FIG. 2C, grooves 20 can be formed in the front surface 1C of the optical waveguide 1. Moreover, as shown in FIG. 2D, protrusions 25 can be formed on the front surface 1C of the optical waveguide 1. In addition, effective inclined planes of the first light source 2 and the second light source 3 may not be located on the same surface. Incidentally, in FIGS. 2C and 2D, the rear surface 1D of the optical waveguide 1 can be parallel to the liquid crystal panel 100, or can be inclined against the liquid crystal panel 100 so that it can efficiently reflect light from the light source 2 toward the liquid crystal panel 100.

Referring back to FIG. 1, in the embodiment, a case where the grooves 20 are formed in the rear surface 1D of the optical waveguide 1 will be described as an example.

In the embodiment, the light from the respective light sources 2 and 3 is reflected and then emitted from the optical waveguide 1 at different exit angles. That is, while the light from the first light source 2 is emitted from the optical waveguide 1 at a small exit angle, the light from the second light source 3 is emitted from the optical waveguide 1 at a wide exit angle. At this time, the exit angle refers to an angle formed by the emitted light and an optical axis (a normal direction of the optical waveguide 1) of the lighting device 10. As such, in order for the light from the first and second light sources 2 and 3 to be emitted from the optical waveguide 1 at different exit angles, grooves 20a are formed corresponding to the first light source 2, and grooves 20b and 20c are formed corresponding to the second light source 3. Further, the grooves 20a and the grooves 20b and 20c include effective inclined planes having different effective gradient angles.

Moreover, the grooves 20a corresponding to the first light source 2, and the grooves 20b and 20c corresponding to the second light source 3 are each formed in a concentric shape around the light sources 2 and 3. In this case, light from each of the light sources is vertically incident to the extending direction of each groove. Thus, in order for the light to be reflected and then emitted from the optical waveguide 1 at a predetermined exit angle, the effective gradient angle of the effective inclined plane of each groove can be easily set.

Further, the first and second light sources 2 and 3 are connected to a control unit 9. The first and second light sources 2 and 3 can be independently driven under the control of the control unit 9.

Figure 3:
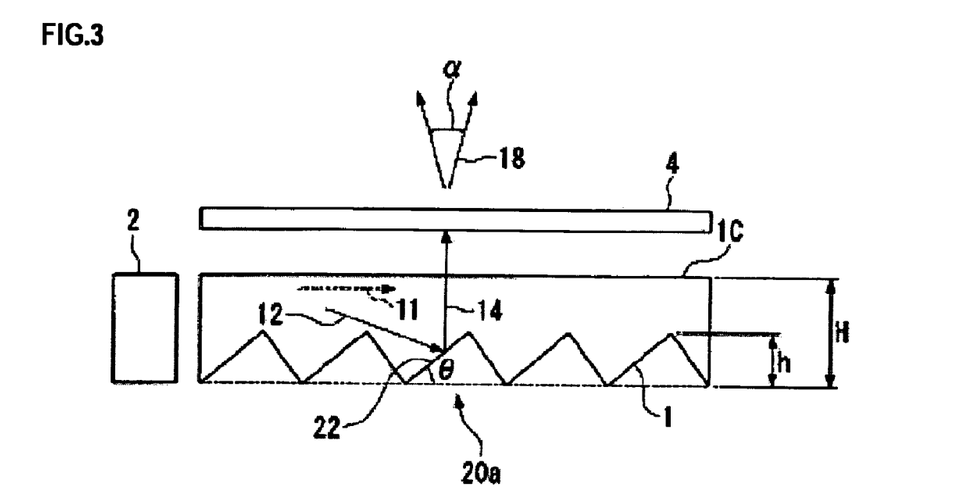
FIG. 3 is an explanatory diagram illustrating the shape of grooves corresponding to a first light source and the light reflection by the grooves.

FIG. 3 is an explanatory diagram illustrating the shape of the grooves 20a corresponding to the first light source and the light reflection by the grooves 20a. There is shown, in FIG. 3, a cross-sectional view taken along line A-A of FIG. 1A. In the embodiment, the thickness H of the optical waveguide 1 is about 0.6 mm, whereas the depth h of the grooves 20a is as small as about 10 μm. For this reason, light 11 parallel to the front surface 1C of the optical waveguide 1 is rarely incident on the grooves 20a, but light 12 inclined several degrees from the surface of the optical waveguide 1, for example, by about 5°, is mainly incident on the grooves 20a. Therefore, in order for the inclined light 12 to be reflected approximately parallel to the normal direction of the optical waveguide 1, an effective gradient angle θ of an effective inclined plane 22 in the grooves 20a is set to 35° to 50°. If reflected light 14 by the effective inclined plane 22 is emitted from the optical waveguide 1 and then incident on the diffuser sheet 4, it is converted into diffused light 18. The diffused light 18 is distributed in a narrow angular range α around the optical axis of the lighting device. Further, by allowing the diffused light 18 to be incident on the liquid crystal panel 100 shown in FIG. 1B, image display having a narrow viewing angle can be realized.

Figure 4:
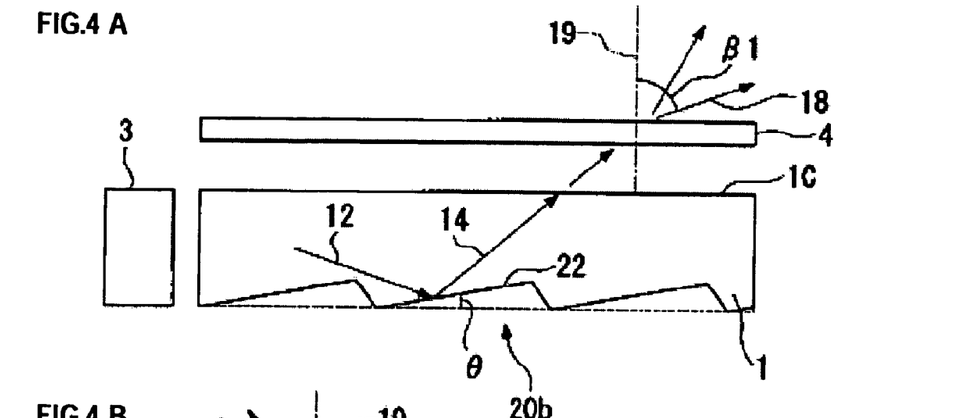
FIGS. 4A and 4B are explanatory diagram illustrating the shape of grooves corresponding to a second light source and the light reflection by the grooves.

FIG. 4 is an explanatory diagram illustrating the shape of the grooves 20b corresponding to the second light source 3 and the light reflection by the grooves 20b. FIG. 4 shows a cross-sectional view taken along line B-B of FIG. 1A. Further, in order to emit light from the second light source 3 in various directions, two or more kinds of inclined planes are preferably formed in the optical waveguide 1. In other words, first grooves 20b are formed, as shown in FIG. 4A, and a second grooves 20c is formed, as shown in FIG. 4B. The first grooves 20b and the second grooves 20c can be preferably formed in an approximately concentric shape, as shown in FIG. 1A. In this case, the first grooves 20b and the second grooves 20c can be formed in the front surface 1C and the rear surface 1D of the optical waveguide 1, respectively.

In the first grooves 20b shown in FIG. 4A, an effective gradient angle θ of an effective inclined plane 22 is set to 5° to 35°. Further, if the inclined light 12 emitted from the second light source 3 is incident on the effective inclined plane 22, it is reflected in a direction away from the light source 3. The reflected light 14 is refracted at the front surface 1C of the optical waveguide 1, and then emitted from the front surface 1C at a near critical angle. If the emitted light is incident on the diffuser sheet 4, it is converted into the diffused light 18, which is distributed in a wide angular range β1 from an optical axis 19 of the lighting device.

Furthermore, in the second grooves 20C shown in FIG. 4B, an effective gradient angle θ of an effective inclined plane 22 is set to 50° to 70°. If inclined light 12 from the second light source 3 is totally reflected from the rear surface 1D of the optical waveguide 1 and then incident on the effective inclined plane 22, it is reflected in a direction that approaches the light source 3. The reflected light 14 is refracted at the front surface 1C of the optical waveguide 1 and then emitted from the front surface 1C at a near critical angle. If the emitted light is incident on the diffuser sheet 4, it is converted into diffused light 18, which is distributed in a wide angular range β2 from the optical axis 19 of the lighting device.

As such, if the first grooves 20b and the second grooves 20c are formed in the optical waveguide 1, the diffused light 18 is distributed in a wide angular range β1 +β2 around the optical axis of the lighting device. Further, by allowing the diffused light 18 to be incident on the liquid crystal panel 100 shown in FIG. 1B, image display having a wide viewing angle can be realized.

As described above in detail, in the lighting device according to the embodiment, the plurality of inclined planes for reflecting light from the light sources and then allowing the light to be emitted from the front surface of the optical waveguide at different exit angles are provided, and each of the light sources is independently driven. Through this configuration, since each of the light sources is independently driven, the exit angle of emitted light can be changed. Further, by allowing emitted light to be incident on the liquid crystal panel, the viewing angle can be varied.

Furthermore, the first and second light sources 2 and 3 can be turned on at the same time. In this case, a narrow viewing angle range can be illuminated by the first light source 2 for a narrow viewing angle and the second light source 3 for a wide viewing angle, and a wide viewing angle range can be illuminated only by the second light source 3 for a wide viewing angle. Thereby, comparatively speaking, the narrow viewing angle range becomes bright and the wide viewing angle range becomes dark. Further, if the brightness to that extent is not needed in the narrow viewing angle range, the amount of light emitted from the first light source 2 for the narrow viewing angle can be controlled. More particularly, the amount of emitted light can be adjusted by controlling the driving signal of the second light source, or by adding electrical resistance. Furthermore, in the same manner, the amount of emitted light of the second light source 3 for the wide viewing angle can be controlled.

Second Embodiment

Figure 5:
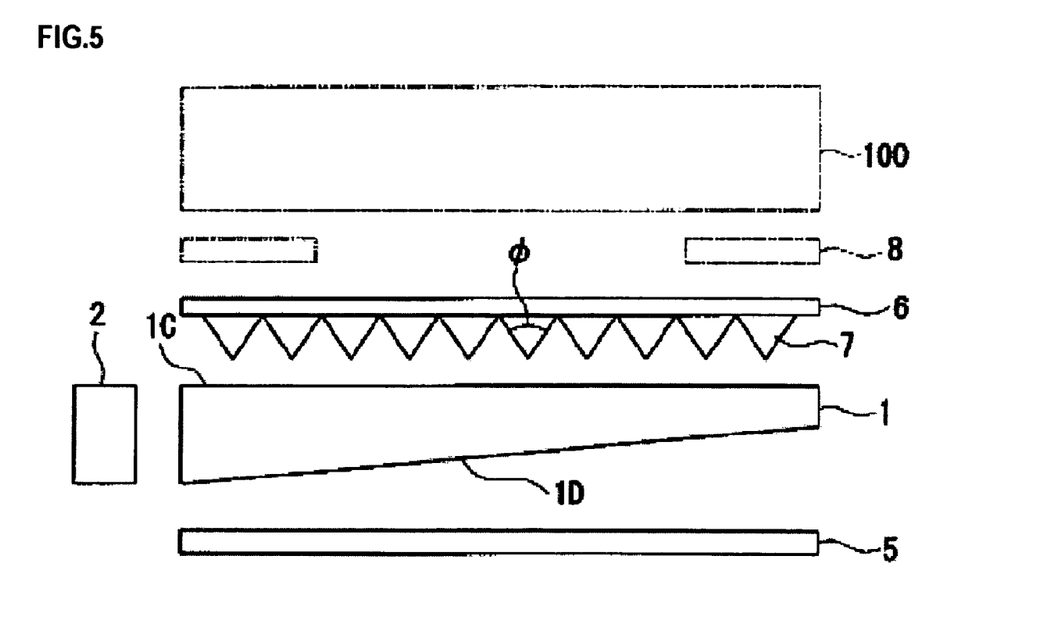
FIG. 5 is an explanatory diagram illustrating a lighting device according to a second embodiment of the invention.

FIG. 5 is an explanatory diagram illustrating a lighting device according to a second embodiment of the invention. The lighting device of the second embodiment is different from that of the first embodiment in which the diffuser sheet is disposed on the front surface 1C of the optical waveguide 1, in that a prism sheet 6 having indentations and protrusions is disposed at a side opposite to the front surface 1C of the optical waveguide 1. Furthermore, the shape of grooves formed in the optical waveguide 1 is different from those of the first embodiment. Moreover, the same reference numerals indicate the same components as those of the first embodiment, and detailed description thereof will be omitted.

In the second embodiment, the prism sheet 6 is disposed on the front surface 1C of the optical waveguide 1, as shown in FIG. 5. The prism sheet 6 includes a plurality of prisms 7 having a tripod pillar shape or a square pillar shape, which are formed by using a light-transmissive material. The vertex of each prism 7 is oriented toward a light-incident side (toward the optical waveguide 1). A vertex angle φ of each prism 7 can be set to 55° to 70°, preferably 63° to 68°. The prism sheet 6 having these prisms 7 can be easily obtained at low cost.

Further, the rear surface 1D of the optical waveguide 1 can be parallel to the liquid crystal panel 100, or can be inclined against the liquid crystal panel 100 so that it can efficiently reflect the light emitted from the light source 2 toward the liquid crystal panel 100.

FIGS. 6A and 6B are explanatory diagrams illustrating the shape of grooves and the light reflection. The above-mentioned prism sheet has a property of converting light having a wide exit angle, which is emitted from the optical waveguide 1, into light having a small exit angle, which is emitted from the prism sheet 6, and converting light having a small exit angle, which is emitted from the optical waveguide 1, into light having a wide exit angle, which is emitted from the prism sheet 6. In the second embodiment, therefore, while light from the first light source 2 is emitted from the optical waveguide 1 at a wide exit angle, the light from the second light source 3 can be emitted from the optical waveguide 1 at a small exit angle. In this respect, effective inclined planes having different effective gradient angles are respectively disposed in the grooves 20a for reflecting light from the first light source 2, and in the grooves 20b for reflecting light from the second light source 3.

FIG. 6A is an explanatory diagram illustrating the shape of grooves 20a corresponding to the first light source 2, and the light reflection by the grooves 20a. The plurality of the grooves 20a having almost the same sectional shape is consecutively formed in a rear surface 1D of an optical waveguide 1. An effective gradient angle θ of an effective inclined plane 22 in the grooves 20a is set to 0.5° to 5°, preferably about 2°.

Furthermore, if inclined light 12r emitted from the light source 2 is incident on an effective inclined plane 22r in the first groove 20a, it is converted into reflected light 14r having an exit angle smaller than the incidence angle. If the exit angle does not exceed a critical angle in the surface of the optical waveguide 1, the reflected light 14r is totally reflected from the front surface 1C of the optical waveguide 1. If reflected light 12s is incident on the effective inclined plane 22 in the second grooves 20a, it is converted into reflected light 14s having an exit angle smaller than the incidence angle. As such, as the light from the light source 2 is repeatedly reflected from the effective inclined plane 22 of the grooves 20a and is repeatedly and totally reflected from the front surface 1C of the optical waveguide 1, it is converted into a reflected light 14s of which an angle with respect to the normal direction of the optical waveguide 1 becomes larger than a critical angle in the surface of the optical waveguide 1. The reflected light 14s is emitted from the surface 1C of the optical waveguide 1 at a near critical angle.

If such an emitted light 15 is incident on the prism 7 from one oblique side thereof, it is totally reflected toward the other oblique side, and then converted into emitted light 18 approximately parallel to the optical axis of the lighting device. Further, by allowing the emitted light 18 to be incident on the liquid crystal panel 100 shown in FIG. 5, image display having a narrow viewing angle can be realized.

FIG. 6B is an explanatory diagram illustrating the shape of grooves 20b corresponding to the second light source 3 and the light reflection by the grooves 20b. The grooves 20b, including effective inclined planes 22 having an effective gradient angle θ of 20° to 50°, are formed in the rear surface 1D of the optical waveguide 1.

Furthermore, if inclined light 12 emitted from the light source 3 is incident on the effective inclined plane 22 in the grooves 20b, it is converted into reflected light 14 approximately parallel to the normal direction of the optical waveguide 1. If the reflected light 14 is emitted from the optical waveguide 1 and then incident on the prism 7, it is refracted at one oblique side and a bottom side of the prism 7 and then converted into emitted light 18a having an exit angle β1. Further, if emitted light from the optical waveguide 1 is incident on the prism 7 from the other oblique side of the prism 7, it is converted into an emitted light 18b having an exit angle β2, which is symmetrical to the emitted light 18a with respect to the optical axis of the lighting device. Thereby, the emitted light 18a and 18b is distributed in a wide angular range of β1+β2 with respect to the optical axis of the lighting device. Further, by allowing the emitted light 18a and 18b to be incident on the liquid crystal panel 100 shown in FIG. 5, image display having a wide viewing angle can be realized. More particularly, if the first and second light sources 2 and 3 are turned on at the same time, image display can be realized over the entire range of the narrow viewing angle and the wide viewing angle.

Even in the lighting device that has been described above in detail according to the second embodiment, the exit angle of the emitted light can be changed in the same manner as in the first embodiment. Furthermore, by allowing the emitted light to be incident on the liquid crystal panel, the viewing angle can be varied.

Figure 6:
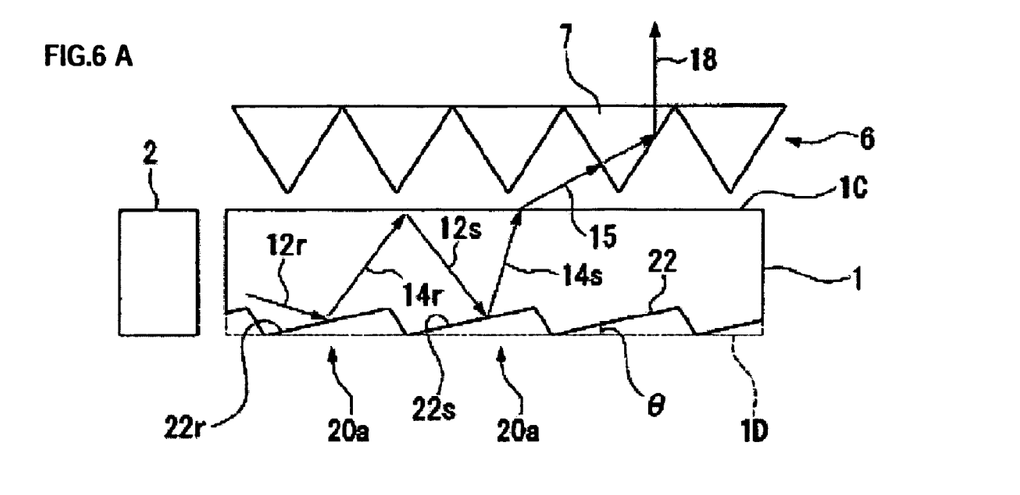
FIGS. 6A and 6B are explanatory diagrams illustrating the shape of grooves and the light reflection by the grooves.
Figure 7:
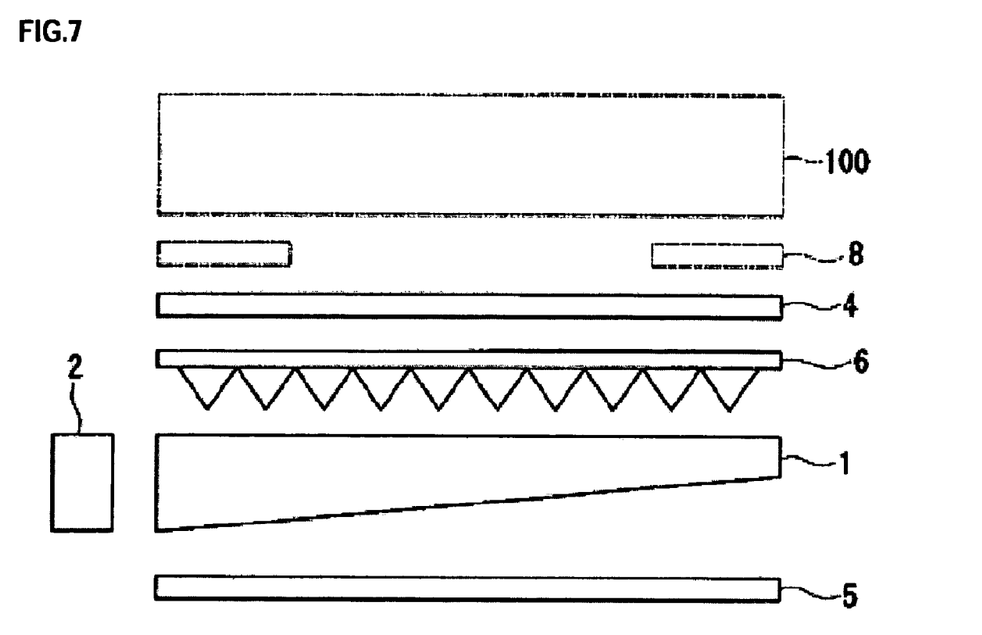
FIG. 7 is an explanatory diagram illustrating a modified example of a lighting device according to the second embodiment of the invention.

FIG. 7 is an explanatory diagram illustrating a modified example of a lighting device according to the second embodiment of the invention. The modified example of the lighting device according to the second embodiment is different from the first embodiment in which only the diffuser sheet 4 is disposed and the second embodiment in which only the prism sheet 6 is disposed, in that the prism sheet 6 and the diffuser sheet 4 are sequentially disposed on the front surface 1C of the optical waveguide 1. Even in this case, in the same manner as the second embodiment shown in FIG. 6, the grooves 20a corresponding to the first light source 2 and the grooves 20b corresponding to the second light source 3 can be preferably formed in the optical waveguide 1. Thereby, not only image display having a narrow viewing angle can be realized by the light emitted from the first light source, but also image display having a wide viewing angle can be realized by the light emitted from the second light source.

Liquid Crystal Display Device

Next, a liquid crystal display device in which a liquid crystal panel is provided at a light emitting side of the lighting device in each of the embodiments will be described with reference to FIGS. 8 and 9.

Figure 8:
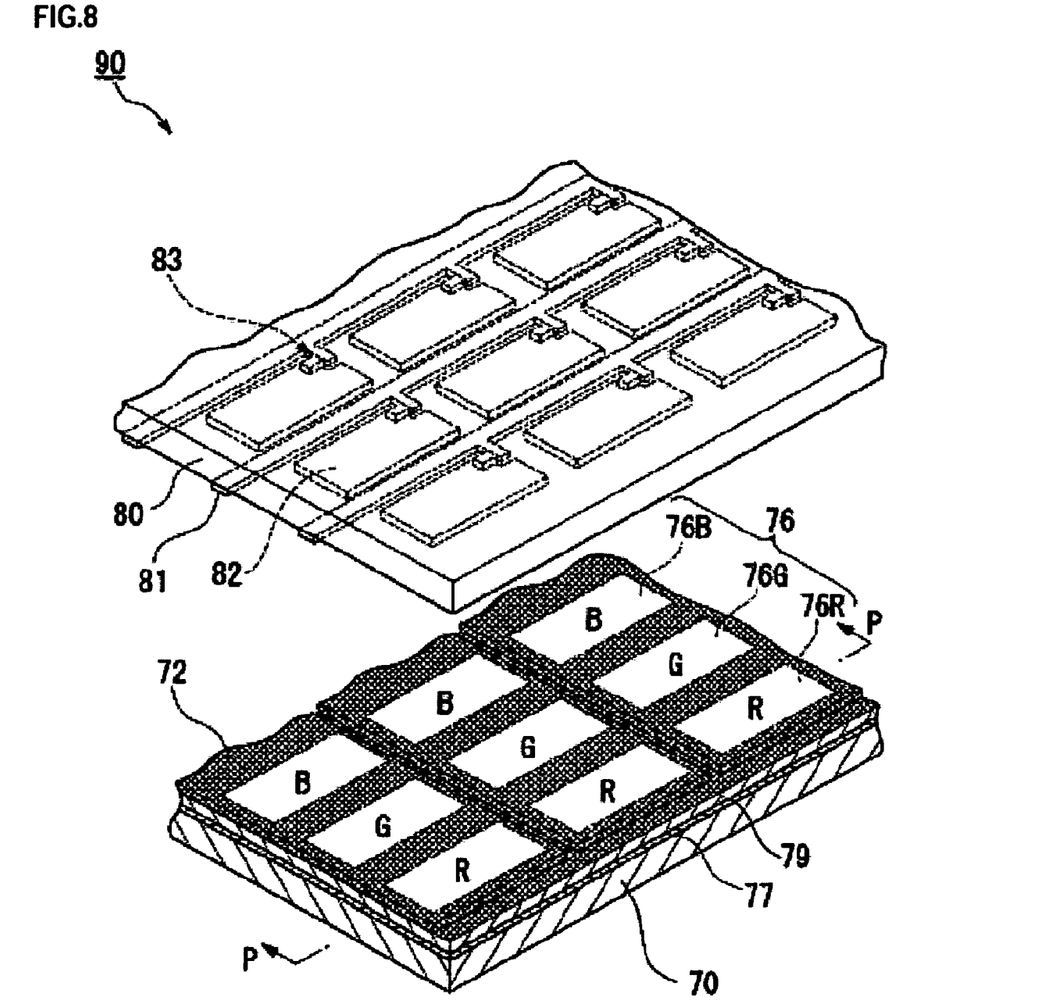
FIG. 8 is an exploded perspective view of a liquid crystal panel.

FIG. 8 is an exploded perspective view illustrating a configuration of the liquid crystal panel. FIG. 9 is a lateral cross-sectional view of the liquid crystal panel taken along line P-P of FIG. 8. Referring to FIG. 9, a liquid crystal panel 90 has a liquid crystal layer 92 interposed between a lower substrate 70 and an upper substrate 80. The liquid crystal layer 92 can be formed by using nematic liquid crystals, and the like. Further, twisted nematic (TN) mode can be adopted as the operating mode of the liquid crystal layer 92. It is, however, to be noted that liquid crystal materials other than the nematic liquid crystal material can be used, and operating modes other than the twisted nematic (TN) mode can be adopted. Furthermore, an active matrix type liquid crystal panel using a TFD element as a switching element will be below described as an example. However, a liquid crystal panel of an active matrix type or a passive matrix type using other switching element can be used.

In the liquid crystal panel 90, the lower substrate 70 and the upper substrate 80, which are made of a transparent material such as glass, are disposed opposite to each other, as shown in FIG. 8.

A plurality of data lines 81 are formed within the upper substrate 80. A plurality of pixel electrodes 82, which are made of a transparent conductive material such as ITO, is arranged adjacent to the data lines 81 in a matrix. Further, a pixel region is constituted by a region where each pixel electrode 82 is formed. The pixel electrodes 82 are connected to the data lines 81 through TFD elements 83. Each of the TFD elements 83 includes a first conductive film mainly composed of Ta and formed on the substrate, an insulating film mainly composed of $Ta_2O_3$ and formed on the first conductive film, and second conductive films mainly composed of Cr and formed on the insulating film (so-called MIM structure). Furthermore, the first conductive films are connected to the data lines 81, and the second conductive film are connected to the pixel electrodes 82. Thereby, the TFD elements 83 serve as a switching element that controls the charging of the pixel electrodes 82.

Meanwhile, color filter films 76 are formed on the lower substrate 70. Each of the color filter films 76 includes color filters 76R, 76G and 76B having an approximately rectangular shape in plan view. The color filters 76R, 76G and 76B are formed by using pigments which transmit only different colors, respectively and are disposed in a matrix corresponding to the respective pixel regions. Further, a light-shielding film 77 for preventing the light leakage in neighboring pixel regions is formed at the peripheral region of the color filters. The light-shielding film 77 can be formed in a form of frame by using black chrome having a light-absorbing property. Furthermore, a transparent insulating film 79 for covering the color filter film 76 and the light-shielding film 77 is also formed.

A plurality of scanning lines 72 is formed on the insulating film 79. The scanning lines 72 is formed in a form of approximately strip using a transparent conductive material such as ITO, and extends in a direction intersecting the data lines 81 of the upper substrate 80. Further, the scanning lines 72 are formed to cover the color filters 76R, 76G and 76B, which are arranged in their extending directions, and thus serve as opposite electrodes. Moreover, if a scanning signal is applied to the scanning lines 72 and a data signal is applied to the data lines 81, electric field is applied to the liquid crystal layer by the pixel electrodes 82 and the opposite electrodes 72, which are disposed opposite to each other.

Figure 9:
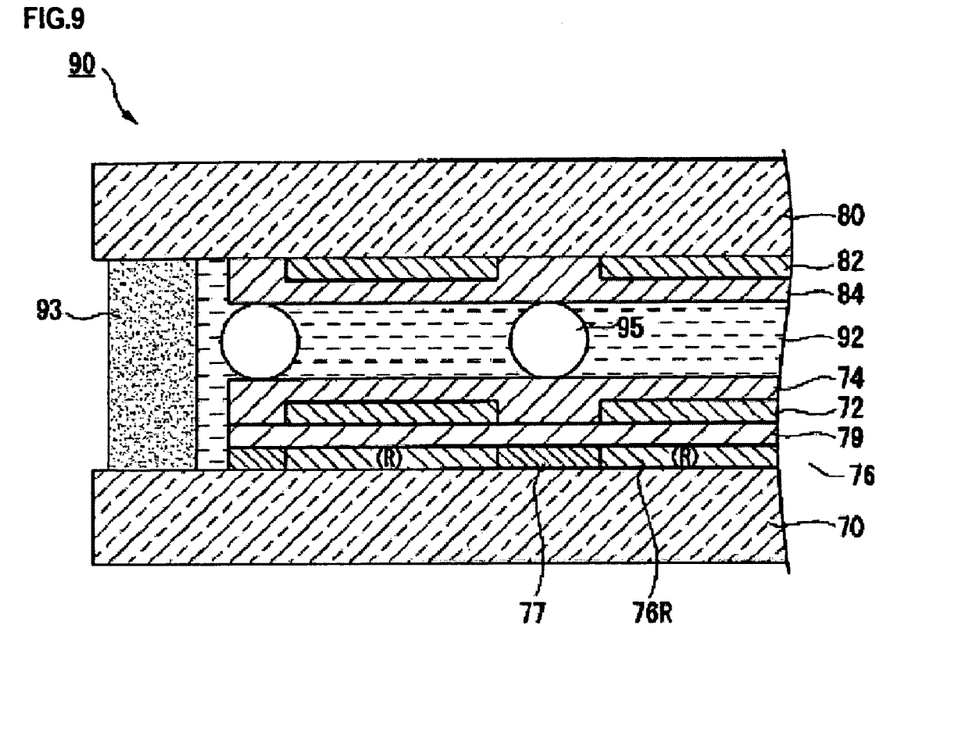
FIG. 9 is a lateral cross-sectional view of a liquid crystal panel.

Furthermore, as shown in FIG. 9, alignment films 74 and 84 are formed to cover the pixel electrodes 82 and the opposite electrodes 72. The alignment films 74 and 84 serve to control the alignment state of liquid crystal molecules when electric field is not applied, and are formed by using polymer materials such as polyamides. A rubbing process is performed on the surface of the alignment films 74 and 84. Thus, when no electric field is applied, a longer axis direction of the liquid crystal molecules near the surface of the alignment films 74 and 84 coincides with the direction of the rubbing process. The liquid crystal molecules are thus aligned substantially parallel to the alignment films 74 and 84. Further, the rubbing process can be carried out on the alignment films 74, 84 so that an alignment direction of liquid crystal molecules near the surface of the alignment films 74 and an alignment direction of liquid crystal molecules near the surface of the alignment films 84 are deviated only at a predetermined angle. Liquid crystal molecules constituting a liquid crystal layer 92 are thus stacked in a spiral direction along the thickness direction of the liquid crystal layer 92.

Moreover, both the substrates 70 and 80 have their edge portions joined by a sealant 93, which is made of a thermosetting or UV curable adhesive. Further, the liquid crystal layer 92 is sealed into a space surrounded by both the substrates 70 and 80 and the sealant 93. The thickness (cell gap) of the liquid crystal layer 92 is defined by spacer particles 95, which are disposed between the substrates.

Meanwhile, polarizing plates (not shown) are disposed outside the lower substrate 70 and the upper substrate 80. The polarizing plates have their polarizing axes (transparent axes) deviated by a predetermined angle. Moreover, a lighting device (not shown) according to each of the embodiments is disposed as a backlight outside the light-incident side polarizing plate.

Furthermore, light incident from the backlight is converted into a straight polarized light in accordance with the polarizing axis of the light-incident side polarization plate, and then incident on the liquid crystal layer 92 from the lower substrate 70. This straight polarized light is rotated by a predetermined angle along the twist direction of liquid crystal molecules, while transmitting through the liquid crystal layer 92 to which no electric field is applied, and then transmits the light-emitting side polarization plate. Thus, when no electric field is applied, white display is performed (normally-white mode). Meanwhile, if electric field is applied to the liquid crystal layer 92, the liquid crystal molecules are realigned vertically to the alignment films 74 and 84 along the direction of the electric field. In this case, since the straight polarized light incident on the liquid crystal layer 92 is not rotated, it does not transmit the light-emitting side polarization plate. Thereby, when no electric field is applied, white display is performed. Furthermore, a gray level display can be performed depending on the intensity of an applied electric field.

The liquid crystal display device 90 is constructed as described above.

Electronic Apparatus

Figure 10:
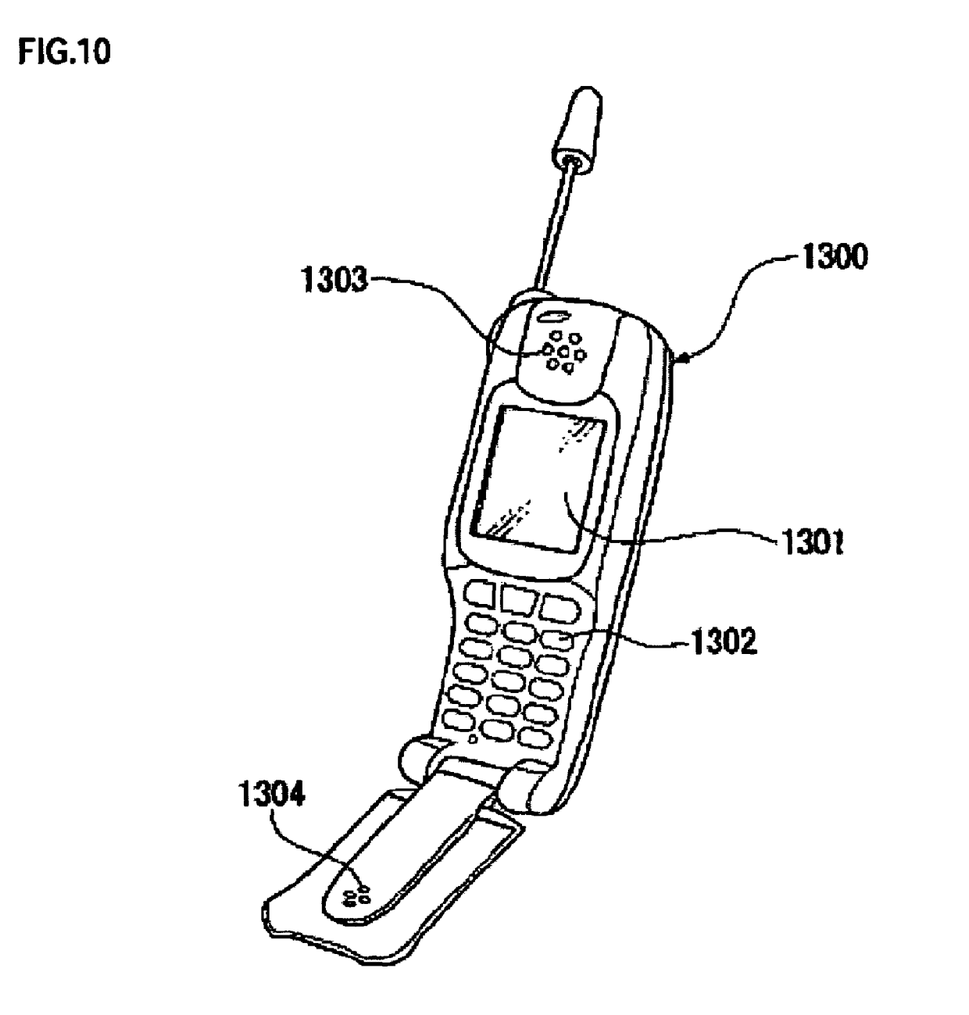
FIG. 10 is a perspective view illustrating a mobile phone.

FIG. 10 is a perspective view illustrating an example of a mobile phone according to the invention. The mobile phone 1300 shown in FIG. 10 includes the above-mentioned liquid crystal display device as a small-sized display unit 1301, a plurality of manual operation buttons 1302, an earpiece 1303, and a mouse piece 1304.

The use of the above-mentioned liquid crystal display device is not limited to the mobile phone, but includes image display unit of portable electronic apparatuses such as e-books, personal computers, digital still cameras, liquid crystal TVs, view finder type or monitor direct-view-type video tape recorders, pagers, digital diaries, calculators, word processors, video telephones and touch panels. In either case, an electronic apparatus having a variable viewing angle can be provided.

It is also to be understood that the technical scope of the invention is not limited to the above-described embodiments, and various modifications can be made to the respective embodiments without departing from the scope and spirit of this invention. That is, the material, configuration, etc. in each of the embodiments are only illustrative, but can be properly changed.

What is claimed is:

1. A lighting device comprising:
   a first light source;
   a second light source driven independently from the first light source; and
   an optical waveguide including:
      side surfaces;
      a first corner that is truncated with respect to portions of the side surfaces connected to the first corner, the first corner having a planar surface that is non-parallel and non-perpendicular with respect to the portions of the side surfaces connected to the first corner, the first light source being disposed to face the planar surface of the first corner;
      a second corner that is truncated with respect to portions of the side surfaces connected to the second corner, the second corner having a planar surface that is non-parallel and non-perpendicular with respect to the portions of the side surfaces connected to the second corner, the second light source being disposed to face the planar surface of the second corner;
      a main plane from which light is emitted;
      a first set of grooves approximately concentric around the first light source, each groove of the first set of grooves having a first tripod pillar shape and including only a first inclined plane facing the first light source, the first inclined plane having only a first effective gradient angle reflecting light from the first light source at a first angle toward the main plane, each first inclined plane of each groove of the first set of grooves having the same first effective gradient angle, the lighting device having a first viewing angle corresponding to the first effective gradient angle when the first light source is driven; and
      a second set of grooves approximately concentric around the second light source, each groove of the second set of grooves having a second tripod pillar shape and including only a second inclined plane facing the second light source, the second inclined plane having only a second effective gradient angle that is different from the first effective gradient angle, the second effective gradient angle reflecting light from the second light source toward the main plane at a second angle different from the first angle, each second inclined plane of each groove of the second set of grooves having the same second effective gradient angle, the lighting device having a second viewing angle corresponding to the second effective gradient angle when the second light source is driven, the second viewing angle being narrower than the first viewing angle.

2. The lighting device according to claim 1, further comprising:
   a light reflective sheet disposed on another main plane of the optical waveguide.

3. The lighting device according to claim 1, further comprising:
   a prism sheet disposed over the main plane of the optical waveguide,
   wherein the prism sheet has indentations and protrusions at a side facing to the main plane of the optical waveguide, and refracts light emitted from the optical waveguide.

4. The lighting device according to claim 3,
   wherein in the prism sheet, the vertex angle of a prism, which is facing to the one main plane of the optical waveguide, is set to 55° to 70°.

5. The lighting device according to claim 3,
   wherein the gradient angle of the first inclined plane is set to 0.5° to 5°, and the gradient angle of the second inclined plane is set to 20° to 50°.

6. The lighting device according to claim 1, further comprising:
   a diffuser sheet disposed over the main plane of the optical waveguide,
   wherein the diffuser sheet diffuses the light emitted from the optical waveguide, and
   wherein the gradient angle of the first inclined plane is set to 35° to 50°, and the gradient angle of the second inclined plane is set to 5° to 35° or 50° to 70°.

7. A liquid crystal display device comprising a liquid crystal device according to claim 1.

8. An electronic apparatus comprising a liquid crystal display device according to claim 7.

9. A display device comprising:
a display panel;
a first light source;
a second light source driven independently from the first light source; and
an optical waveguide including:
- a main plane from which light is emitted toward the display panel;
- a first set of grooves each groove having a first tripod pillar shape and including only a first inclined plane facing the first light source, the first inclined plane having only a first effective gradient angle reflecting light from the first light source at a first angle toward the main plane, each first inclined plane of each groove of the first set of grooves having the same first effective gradient angle so the display panel has a first viewing angle that corresponds to the first angle while the first light source is driven; and
- a second set of grooves each groove having a second tripod pillar shape and including only a second inclined plane facing the second light source, the second inclined plane having only a second effective gradient angle that is different from the first effective gradient angle, the second effective gradient angle reflecting light from the second light source toward the main plane at a second angle different from the first angle, each second inclined plane of each groove of the second set of grooves having the same second effective gradient angle so the display panel has a second viewing angle that corresponds to the second angle while the second light source is driven, the second viewing angle being narrower than the first viewing angle.

* * * * *